(12) United States Patent
Frosell et al.

(10) Patent No.: US 9,920,621 B2
(45) Date of Patent: Mar. 20, 2018

(54) MAGNETIC LOCATION DETERMINATION IN A WELLBORE

(71) Applicant: Halliburton Energy Services, Inc., Houston, TX (US)

(72) Inventors: Thomas J. Frosell, Irving, TX (US); Michael L. Fripp, Carrollton, TX (US); Zachary R. Murphree, Dallas, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 62 days.

(21) Appl. No.: 14/647,055

(22) PCT Filed: Dec. 31, 2013

(86) PCT No.: PCT/US2013/078493
§ 371 (c)(1),
(2) Date: May 22, 2015

(87) PCT Pub. No.: WO2015/102621
PCT Pub. Date: Jul. 9, 2015

(65) Prior Publication Data
US 2016/0032712 A1   Feb. 4, 2016

(51) Int. Cl.
*E21B 47/09*   (2012.01)
*G01V 3/26*   (2006.01)

(52) U.S. Cl.
CPC .......... *E21B 47/0905* (2013.01); *G01V 3/26* (2013.01)

(58) Field of Classification Search
None
See application file for complete search history.

(56) References Cited

U.S. PATENT DOCUMENTS

| 6,411,084 B1 | 6/2002 | Yoo |
| 7,383,883 B2 | 6/2008 | Gerez et al. |
| 2004/0238165 A1 | 12/2004 | Salamitou et al. |

(Continued)

FOREIGN PATENT DOCUMENTS

EP   1076155 A1   2/2001

OTHER PUBLICATIONS

International Search Report and the Written Opinion of the International Searching Authority, or the Declaration, dated Sep. 25, 2014, PCT/US2013/078493, 16 pages, ISA/KR.

*Primary Examiner* — Jermele M Hollington
*Assistant Examiner* — Douglas X Rodriguez

(57) ABSTRACT

A magnetic system for determining the location of a wellbore component in a first string relative to a wellbore component in a second string. The system includes a circumferentially distributed array of magnets positioned in the first string that is operable to produce a magnetic field in the wellbore proximate the location of the array of magnets. A magnetic field detector is operably associated with the second string and is operable to detect a magnetic signature of the magnetic field. One of the first and second strings is stationary within the wellbore. The other of the first and second strings is moveable in the wellbore such that the magnetic field detector is moveable relative to the magnetic field and such that when the magnetic field detector identifies the magnetic signature, the location of the array of magnets is correlated with the magnetic field detector.

19 Claims, 6 Drawing Sheets

(56) References Cited

U.S. PATENT DOCUMENTS

2005/0205248 A1  9/2005 Barolak et al.
2016/0145999 A1* 5/2016 Clarkson .................. G01V 3/10
                                                340/854.6

* cited by examiner

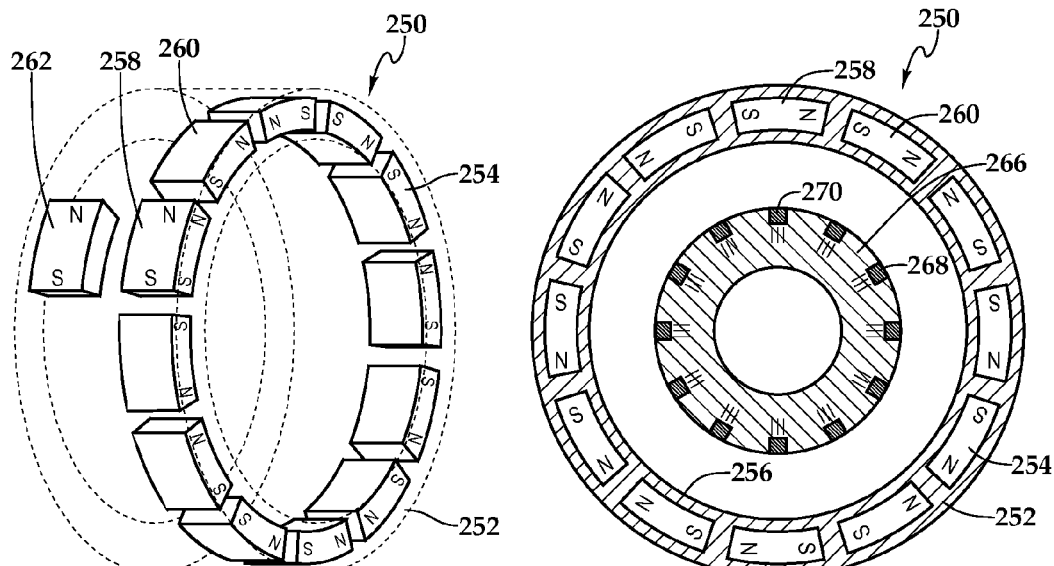
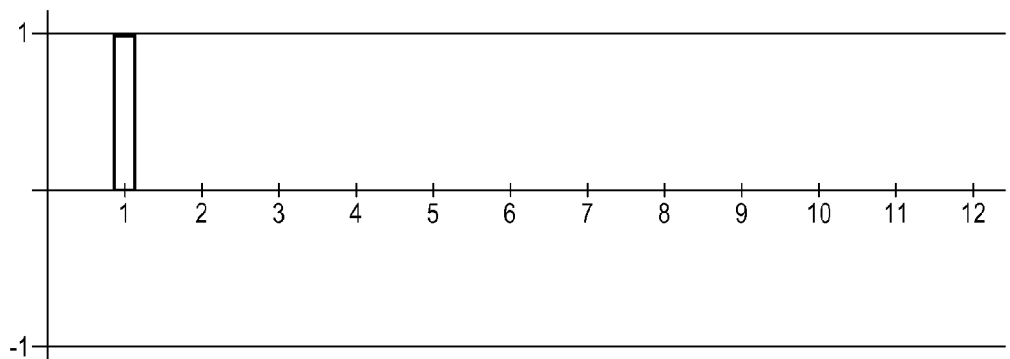
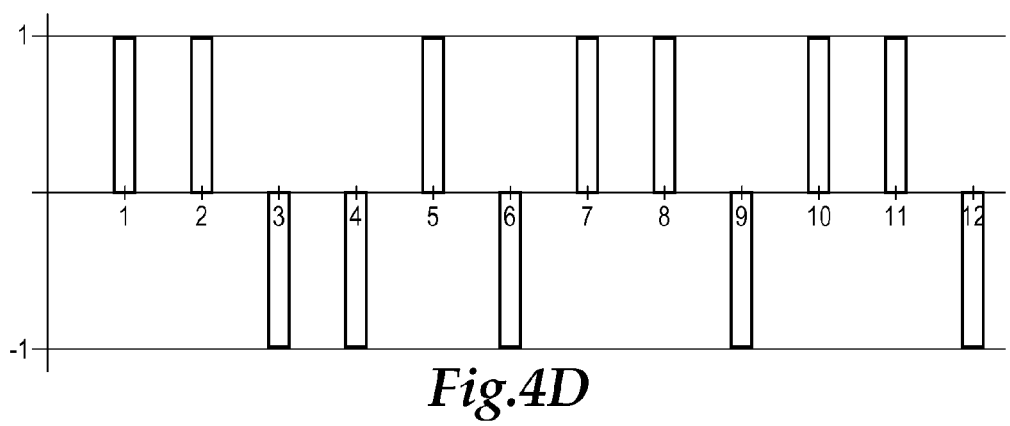

MAGNETIC LOCATION DETERMINATION IN A WELLBORE

The present application is a U.S. National Stage patent application of International Patent Application No. PCT/US2013/078493, filed on Dec. 31, 2013, the benefit of which is claimed and the disclosure of which is incorporated herein by reference in its entirety.

TECHNICAL FIELD OF THE DISCLOSURE

This disclosure relates, in general, to equipment utilized in conjunction with operations performed in relation to subterranean wells and, in particular, to magnetic systems and methods for use in determining the location of a wellbore component in a stationary wellbore string relative to a wellbore component in a moveable wellbore string.

BACKGROUND

After drilling each section of a subterranean wellbore that traverses one or more hydrocarbon bearing subterranean formations, individual lengths of metal tubulars are typically secured together to form a casing string that is positioned within the wellbore. This casing string provides wellbore stability to counteract the geomechanics of the formation such as compaction forces, seismic forces and tectonic forces, thereby preventing the collapse of the wellbore wall. Conventionally, the casing string is cemented within the wellbore. To produce fluids into the casing string, hydraulic openings or perforations must be made through the casing string and a distance into the formation. Following the perforation process, a production tubing string may be installed within the casing string such that fluid from the producing intervals may be transported to the surface therein.

Various downhole tools, such as tools for fluid flow control, sand control and pressure containment, may also be positioned in the wellbore. For example, such downhole tools may be coupled within a production tubing string that may be installed within the casing string or may be lowered into the tubing string or casing string on a service string, such as a jointed tubing, a coiled tubing and wireline or other conveyance. For such downhole tools to perform their intended functions, they must be positioned in the wellbore at the proper depth. As such, knowledge of the precise location of one wellbore string within or relative to another wellbore string may be necessary when positioning tools downhole. Determination of a true downhole depth measurement, however, may be difficult due to, for example, inaccuracies in a depth reference log, elongation from thermal effects, buckling, stretching or friction effects, or other unpredictable deformations in the length of wellbore strings.

After certain downhole tools have been positioned within the wellbore, they may require actuation from a first operating state to a second operating state or require actuation between various operating states. For example, a packer may require actuation from an unset configuration to set configuration, while a fluid flow control device may require actuation between a closed configuration, a fully open configuration and various choking configurations. When such an actuation of a downhole tool is required, identification of the specific downhole tool to be actuated by its depth in the well, may be desirable.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 4A is a perspective view, partially in phantom, of a magnetic sleeve for use in a magnetic system for location determination in a wellbore according to an embodiment of the present disclosure;

FIG. 4B is a cross sectional view of a magnetic sleeve having a magnetic field detector disposed therein for use in a magnetic system for location determination in a wellbore according to an embodiment of the present disclosure;

FIG. 4C is a graph of a magnetic signature obtained using a magnetic system for location determination in a wellbore according to an embodiment of the present disclosure;

FIG. 4D is a graph of a magnetic signature obtained using a magnetic system for location determination in a wellbore according to another embodiment of the present disclosure;

DETAILED DESCRIPTION

Figure 1:
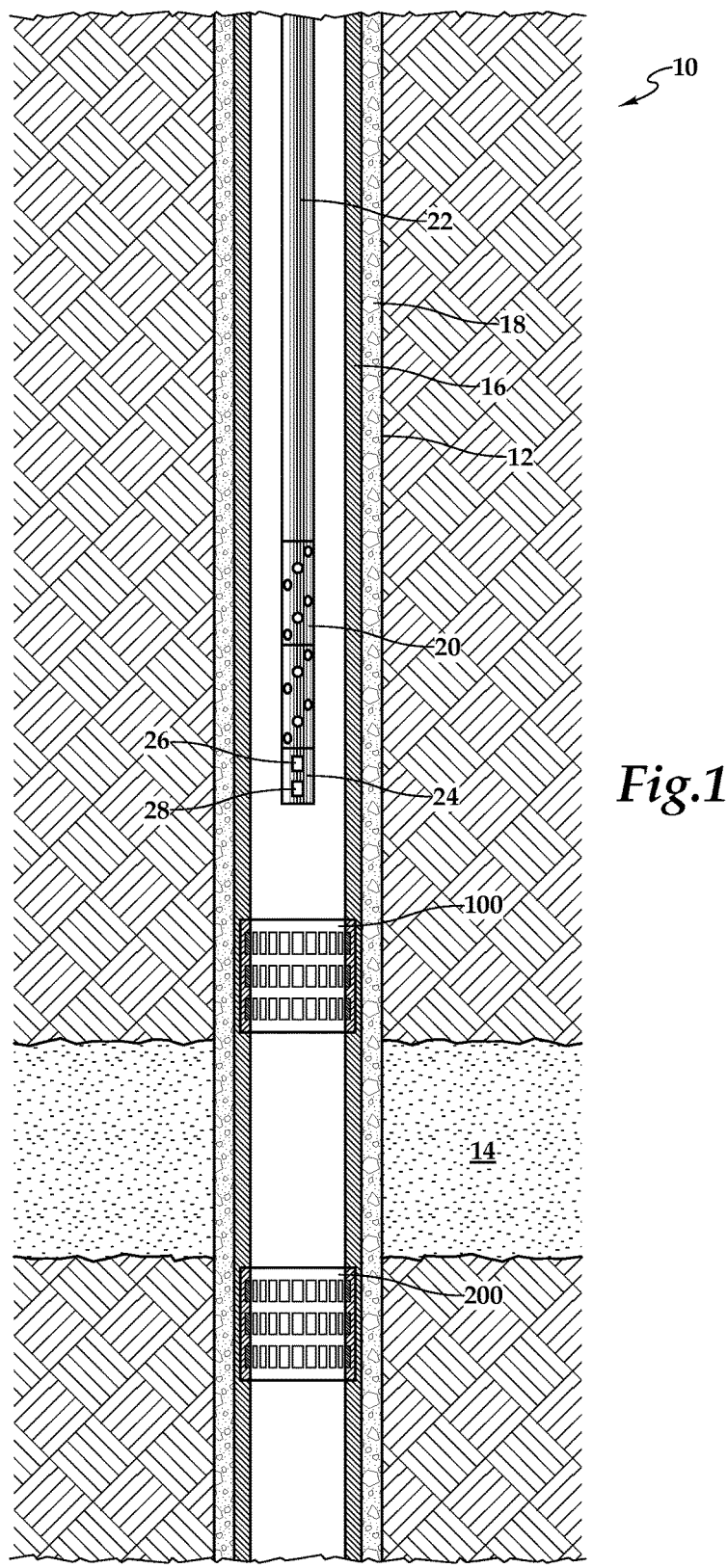
FIG. 1 is a schematic illustration of a well system operating a magnetic system for location determination in a wellbore according to an embodiment of the present disclosure.

While various system, method and other embodiments are discussed in detail below, it should be appreciated that the present disclosure provides many applicable inventive concepts, which can be embodied in a wide variety of specific contexts. The specific embodiments discussed herein are merely illustrative, and do not delimit the scope of the present disclosure.

In a first aspect, the present disclosure is directed to a magnetic system for determining the location of a wellbore component in a first string relative to a wellbore component in a second string. The system includes a circumferentially distributed array of magnets positioned in the first string. The array of magnets is operable to produce a magnetic field in the wellbore proximate the location of the array of magnets. A magnetic field detector is operably associated with the second string and is operable to detect a magnetic signature of the magnetic field. One of the first and second strings is stationary within the wellbore. The other of the first and second strings is moveable in the wellbore such that the magnetic field detector is moveable relative to the magnetic field and such that when the magnetic field detector identifies the magnetic signature, the location of the array of magnets in the first string is correlated with the magnetic field detector of the second string.

In one embodiment, the array of magnets is positioned in the stationary string and the magnetic field detector is operably associated with the moveable string. In another embodiment, the array of magnets is positioned in the moveable string and the magnetic field detector is operably associated with the stationary string. In some embodiments, the array of magnets may include an axially distributed array of magnets. In certain embodiments, the magnetic signature may include a digital address that may be generated by circumferentially distributed magnets, axially distributed magnets or both. In addition, the digital address may be generated based upon at least one of magnetic field orientation, magnetic field strength and magnet spacing of the magnets in the array of magnets or may be generated based upon changes in magnetic properties in the array of magnets. In one embodiment, the magnetic field detector may include at least two magnetic field detector elements each of which is operable to detect the magnetic signature. In another embodiment, the magnetic field detector may include a circumferentially distributed array of magnetic field detector elements.

In a second aspect, the present disclosure is directed to a magnetic system for determining the location of a wellbore component in a first string relative to a wellbore component in a second string. The system includes a circumferentially distributed array of magnets positioned in the first string that is stationary within the wellbore. The array of magnets is operable to produce a magnetic field in the wellbore proximate the location of the array of magnets. A magnetic field detector is operably associated with the second string that is moveable within the wellbore. The magnetic field detector is operable to detect a magnetic signature including a digital address of the magnetic field such that when the magnetic field detector is moved through the magnetic field and identifies the magnetic signature, the identity of the array of magnets is determined and the location of the array of magnets in the first string is correlated with the magnetic field detector of the second string.

In a third aspect, the present disclosure is directed to a method for determining the location of a wellbore component in a first string relative to a wellbore component in a second string. The method includes providing a circumferentially distributed array of magnets positioned in the first string and a magnetic field detector operably associated with the second string; positioning the first and second strings in the wellbore, one of the first and second strings being stationary within the wellbore, the other of the first and second strings being moveable in the wellbore; producing a magnetic field in the wellbore proximate the location of the array of magnets; moving the magnetic field detector relative to the magnetic field; detecting a magnetic signature of the magnetic field; and correlating the location of the array of magnets in the first string with the magnetic field detector of the second string.

The method may also include fixing the first string with the array of magnets in the wellbore and moving the second string with the magnetic field detector in the wellbore; fixing the second string with the magnetic field detector in the wellbore and moving the first string with the array of magnets in the wellbore; producing at least a portion of the magnetic field with an axially distributed array of magnets; generating a digital address; generating the digital address with circumferentially distributed magnets; generating the digital address with axially distributed magnets; generating a digital address based upon at least one of magnetic field orientation, magnetic field strength and magnet spacing of the magnets in the array of magnets; generating a digital address based upon changes in magnetic properties in the array of magnets; detecting the magnetic signature with at least two magnetic field detector elements and/or detecting the magnetic signature with an array of circumferentially distributed magnetic field detector elements.

FIG. 1 is a schematic illustration of a well system 10 operating a magnetic system for location determination in a wellbore according to an embodiment of the present disclosure. In the illustrated embodiment, wellbore 12 extends through the various earth strata including a hydrocarbon bearing subterranean formation 14. Wellbore 12 has a casing string 16 secured therein by cement 18. To produce fluids into wellbore 12 from formation 14, hydraulic openings or perforations must be made through casing string 16. In the illustrated embodiment, a tubing conveyed perforating apparatus 20 is being lowered into wellbore 12 on a service string 22 such as a joined tubing, a coiled tubing, a wireline or other conveyance. In order to assure that the perforations are made in the desired location through casing string 16 and into formation 14, the magnetic system for location determination in a wellbore of the present disclosure is being used.

In the illustrated embodiment, magnetic sleeves 100, 200 are positioned in casing string 16 and service string 22 includes a magnetic field detector 24. When magnetic field detector 24 is moved through the magnetic fields produced by magnetic sleeves 100, 200, the respective magnetic signatures of the magnetic fields produced by magnetic sleeves 100, 200 are detected by magnetic field detector 24. The magnetic signature information may be sent to the surface using a wired or wireless communication protocol or may be stored in memory associated with magnetic field detector 24. The magnetic signature information is then used to correlate the location of magnetic field detector 24 relative to the location of magnetic sleeves 100, 200 such that a precise location for detonation of perforating apparatus 20 can be established. In this manner, the location of a wellbore component in a first string, in this case the arrays of magnetic sleeves 100, 200 in casing string 16, can be correlated to the location of a wellbore component in a second string, in this case magnetic field detector 24 in service string 22.

Figure 2A:
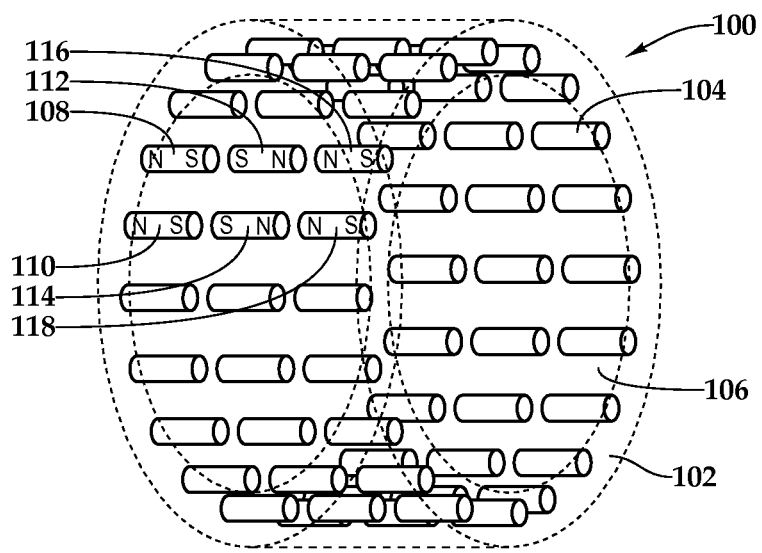
FIG. 2A is a perspective view, partially in phantom, of a magnetic sleeve for use in a magnetic system for location determination in a wellbore according to an embodiment of the present disclosure.

Referring additionally to FIG. 2A, magnetic sleeve 100 has an annular body 102 preferably formed from a nonmagnetic material such as metal, plastic, ceramic or other suitable material. An array of magnets 104 may be disposed entirely within annular body 102 or may have an exposed surface that preferably coincides with the inner diameter 106 of annular body 102. In the illustrated embodiment, array of magnets 104 can be described as having a plurality of circumferentially distributed rows of axially distributed magnets, in this case, twenty circumferentially distributed rows, wherein one circumferential row includes magnets 108, 112, 116 and another circumferential row includes magnets 110, 114, 118. Alternatively or additionally, array of magnets 104 can be described as having a plurality of axial layers of circumferentially distributed magnets, in this case, three axial layers, wherein one axial layer includes magnets 108, 110, another axial layer include magnets 112, 114 and a further axial layer includes magnets 116, 118. As such, array of magnets 104 can be said to include both axially distributed arrays of magnets and circumferentially distributed arrays of magnets. Depend upon factors such as the magnetic field orientation, magnetic strength, size, shape and the material of each magnet, array of magnets 104 will produce a particular magnetic field. For example, regarding magnetic field orientation, the magnets may have N-S polarity, as illustrated, in the axial direction of the wellbore. Alternatively, the N-S polarity may be in the circumferential direction of the wellbore, in the radial direction of the wellbore or in some combination of the axial, radial and circumferential directions of the wellbore.

The signature of this magnetic field can be detected using, for example, magnetic field detector 24 when it is run downhole into magnetic communication with the magnetic field. In the illustrated embodiment of FIG. 1, magnetic field detector 24 includes two magnetic field detector elements or sensors 26, 28, each of which is operable to independently detect the signature of the magnetic field. For example, magnetic field detector elements 26, 28 may be Hall-Effect sensors that have an output proportional to the change in flux density of the magnetic field and are sensitive to the polarity of the magnetic field. Alternatively, magnetic field detector elements 26, 28 may be other types of magnetic field sensors including, for example, giant magnetoresistance (GMR) sensors, biased GMR sensors or other suitable magnetic field sensors. Referring again to FIG. 2A, each of the magnets in each of the axial layers of magnets has the same polarity. For example, magnets 108, 110 of the axial layer to the right are oriented as N-S polarity. Similarly, magnets 112, 114 of the axial layer to the center are oriented as S-N polarity. Likewise, magnets 116, 118 of the axial layer to the left are oriented as N-S polarity. Having the magnets oriented in this manner allows for the use of a magnetic field detector having a single magnetic field detector element or multiple magnetic field detector elements located along a single circumferential position on the magnetic field detector such as the depicted magnetic field detector 24.

Figure 2B:
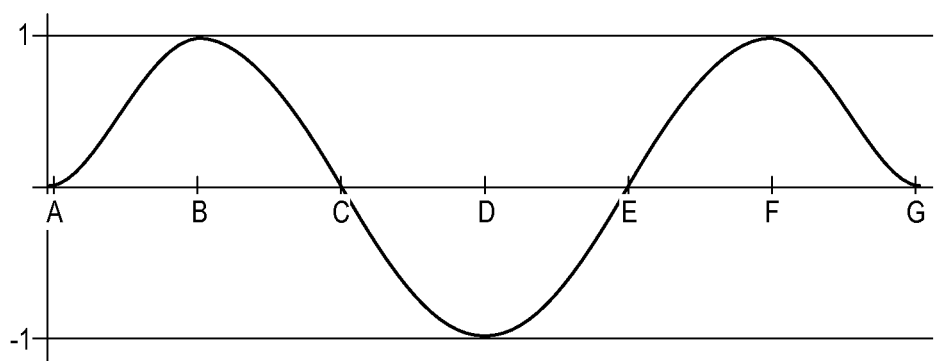
FIG. 2B is a graph of a magnetic signature obtained using a magnetic system for location determination in a wellbore according to an embodiment of the present disclosure.

In this configuration of magnets, when magnetic field detector 24 is moved in the downhole direction through the magnetic field generated by array of magnets 104 in FIG. 2A, each of the magnetic field detector elements 26, 28 may detect a magnetic signature similar to that depicted in FIG. 2B. In the graph, the vertical scale represents a magnetic field detector element output and the horizontal scale represents a magnetic field detector element position. Point A represents the position when a magnetic field detector element, such as element 28, first detects the magnetic field generated by a magnet or magnets in the axial layer to the right, such as magnet 108, which represents the magnet that is circumferentially aligned with element 28 as element 28 is moved through the magnetic field. Point B represents the position when element 28 is centered relative to magnet 108. Point C represents the position when element 28 is centered between magnets 108, 112. Point D represents the position when element 28 is centered relative to magnet 112. Point E represents the position when element 28 is centered between magnets 112, 116. Point F represents the position when element 28 is centered relative to magnet 116. Point G represents the position when element 28 is leaving the magnetic field generated by magnet 116. A similar magnetic signature would be detected if magnetic field detector 24 were moved in the uphole direction through the magnetic field generated by array of magnets 104 in FIG. 2A. In this example, the magnetic signature of magnetic sleeve 100 detected by magnetic field detector 24 when magnetic field detector 24 is moving in the downhole direction may be referred to as the digital address of (1, −1, 1). Likewise, the magnetic signature of magnetic sleeve 100 detected by magnetic field detector 24 when magnetic field detector 24 is moving in the uphole direction may be referred to as the digital address of (1, −1, 1). Thus, when magnetic field detector 24 reads a digital address of (1, −1, 1) in a detected magnetic signature, the location of magnetic field detector 24 in service string 22 corresponds to the location of magnetic sleeve 100 in casing string 16.

Figure 3A:
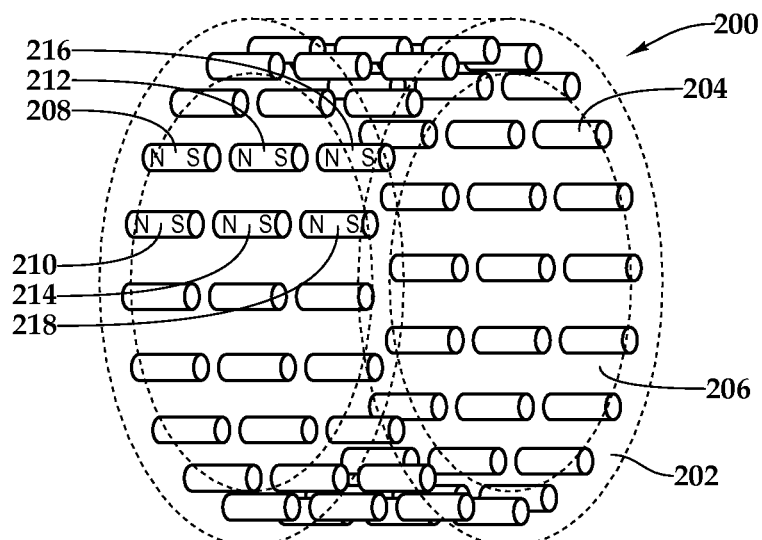
FIG. 3A is a perspective view, partially in phantom, of a magnetic sleeve for use in a magnetic system for location determination in a wellbore according to an embodiment of the present disclosure.

Referring additionally now to FIG. 3A, magnetic sleeve 200 has an annular body 202 preferably formed from a non-magnetic material such as metal, plastic, ceramic or other suitable material. An array of magnets 204 is disposed entirely within annular body 202 or may have an exposed surface that preferably coincides with the inner diameter 206 of annular body 202. In the illustrated embodiment, array of magnets 204 can be described as having a plurality of circumferentially distributed rows of axially distributed magnets, in this case, twenty circumferentially distributed rows, wherein one circumferential row includes magnets 208, 212, 216 and another circumferential row includes magnets 210, 214, 218. Alternatively or additionally, array of magnets 204 can be described as having a plurality of axial layers of circumferentially distributed magnets, in this case, three axial layers, wherein one axial layer includes magnets 208, 210, another axial layer include magnets 212, 214 and a further axial layer includes magnets 216, 218. As such, array of magnets 204 includes both axially distributed arrays of magnets and circumferentially distributed arrays of magnets.

Depend upon factors such as the magnetic field orientation, magnetic strength, size, shape and the material of each magnet, array of magnets 204 will produce a particular magnetic field. For example, each of the magnets in each of the axial layers of magnets has the same polarity. In this case, magnets 208, 210 of the axial layer to the right are oriented as N-S polarity. Similarly, magnets 212, 214 of the axial layer to the center are oriented as N-S polarity. Likewise, magnets 216, 218 of the axial layer to the left are oriented as N-S polarity. In this configuration of magnets, when magnetic field detector 24 is moved in the downhole direction through the magnetic field generated by array of magnets 204 in FIG. 3A, each of the magnetic field detector elements 26, 28 may detect a magnetic signature similar to that depicted in FIG. 3B. In the graph, the vertical scale represents a magnetic field detector element output and the horizontal scale represents a magnetic field detector element position. Point A represents the position when element 28 first detects the magnetic field generated by magnet 208. Point B represents the position when element 28 is centered relative to magnet 208. Point C represents the position when element 28 is centered between magnets 208, 212. Point D represents the position when element 28 is centered relative to magnet 212. Point E represents the position when element 28 is centered between magnets 212, 216. Point F represents the position when element 28 is centered relative to magnet 216. Point G represents the position when element 28 is leaving the magnetic field generated by magnet 216. A similar magnetic signature would be detected if magnetic field detector 28 were moved in the uphole direction through the magnetic field generated by array of magnets 204. In this example, the magnetic signature of magnetic sleeve 200 detected by magnetic field detector 24 when magnetic field detector 24 is moving in the downhole direction may be referred to as the digital address of (1, 1, 1). Likewise, the magnetic signature of magnetic sleeve 200 detected by magnetic field detector 24 when magnetic field detector 24 is moving in the uphole direction may be referred to as the digital address of (1, 1, 1). Thus, when magnetic field detector 24 reads a digital address of (1, 1, 1) in a detected magnetic signature, the location of magnetic field detector 24 in service string 22 corresponds to the location of magnetic sleeve 200 in casing string 16.

Figure 3B:
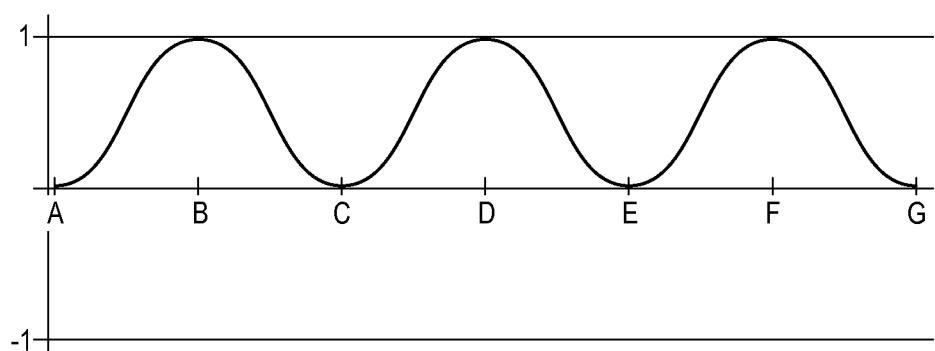
FIG. 3B is a graph of a magnetic signature obtained using a magnetic system for location determination in a wellbore according to an embodiment of the present disclosure.

By comparing the detected magnetic signatures depicted in FIGS. 2B and 3B, it can be seen that magnetic sleeves 100, 200 have unique digital addresses; namely, (1, −1, 1) and (1, 1, 1). Using three axial layers of magnets in each magnetic sleeve yields eight unique addresses. If additional unique addresses are required, additional axial layers of magnets can be added to the magnetic sleeves. If it is desirable to be able to identify the direction of movement of magnetic field detector 24 relative to magnetic sleeves 100, 200, the uphole axial layer of each array of magnets could yield (−1) while the downhole axial layer of each array of magnets could yield (1). In such an embodiment, the axial layers of each array of magnets between the uphole axial layer and the downhole axial layer would provide the unique digital addresses. In this example, for magnetic sleeves yielding the same digital address as magnetic sleeves 100, 200, the magnetic signatures would be (−1, 1, −1, 1, 1) and (−1, 1, 1, 1, 1), respectively, if detected by a magnetic field detector 24 moving in the downhole direction. Likewise, the magnetic signatures would be (1, 1, −1, 1, −1) and (1, 1, 1, 1, −1), respectively, if detected by a magnetic field detector 24 moving in the uphole direction.

Instead of having each magnetic field detector element 26, 28 independently detect the magnetic signatures, magnetic field detector elements 26, 28 could alternatively be used together to sense the magnetic field generated by each magnet differentially. Use of this differential sensing technique makes the magnetic system for location determination in a wellbore of the present disclosure less sensitive to stray magnetic fields, however, more axial layers of magnets are required to yield the same bits of information.

Even though FIG. 1 depicts the disclosed system in a cased hole environment, it should be understood by those skilled in the art that the disclosed system is equally well suited for use in open hole wells. In addition, even though FIG. 1 depicts the system in a vertical wellbore, it should be understood by those skilled in the art that the disclosed system is equally well suited for use in wells having other directional configurations including horizontal wells, deviated wells, slanted wells, multilateral wells and the like. Accordingly, it should be understood by those skilled in the art that the use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

FIG. 4A depicts another embodiment of a magnetic sleeve 250 for use in a magnetic system for location determination in a wellbore. Magnetic sleeve 250 has an annular body 252 preferably formed from a non-magnetic material such as metal, plastic, ceramic or other suitable material. An array of magnets 254 is disposed entirely within annular body 252 or may have an exposed surface that preferably coincides with the inner diameter 256 of annular body 252. In the illustrated embodiment, array of magnets 254 can be described as a circumferentially distributed array of magnets, in the case twelve magnets, including magnets 258, 260 and an axially distributed array of magnets, in this case two magnets, including magnets 262, 258. As best seen in FIG. 4B, a magnetic field detector 266 preferably includes at least one circumferentially distributed array of magnetic field detector elements 268 that preferably corresponds in number with the number of magnets in the circumferentially distributed array of magnets, in this case twelve elements 268. In this manner, there is one-to-one correspondence between the magnetic field detector elements 268 and the magnets in the circumferentially distributed array of magnets. It should be understood by those skilled in the art that ratios other than one-to-one between the elements 268 and the magnets in array of magnets 254 are possible and are considered to be within the scope of the present disclosure.

In the illustrated embodiment, when magnetic field detector 266 is moved in the downhole direction through the magnetic field generated by array of magnets 254, at least one of the magnetic field detector elements, in this case element 270, may detect a magnetic signature similar to that depicted in FIG. 4C when element 270 detects the magnetic field generated by magnet 262. In the graph, the vertical scale represents a magnetic field detector element output and the horizontal scale represents which magnetic field detector element is making the reading. In the illustrated embodiment, element 270 becomes element 1 on the horizontal scale as element 270 was the element to make the reading associated with magnet 262. Thereafter, each of the magnetic field detector elements 268 would read a magnetic field generated by at least one of the magnets in the circumferential array. These readings could be represented by the graph in FIG. 4D, wherein a S-N polarity registers as (1) and a N-S polarity registers as (−1). The detected magnetic signature generated by the circumferential array provides a unique digital address. Using twelve magnets in the circumferential array and twelve detector elements yields 4,096 unique addresses.

Figure 5:
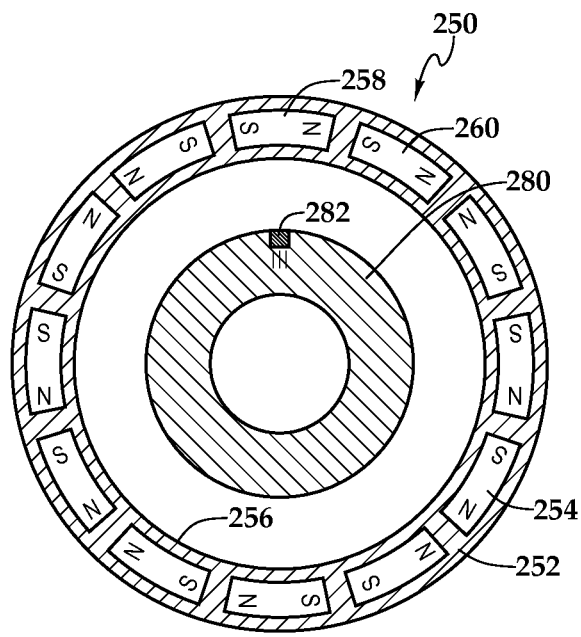
FIG. 5 is a cross sectional view of a magnetic sleeve having a magnetic field detector disposed therein for use in a magnetic system for location determination in a wellbore according to an embodiment of the present disclosure.

Alternatively, instead of using a circumferential array of detector elements, a magnetic field detector having a single magnetic field detector element or multiple magnetic field detector elements located along a single circumferential position on the magnetic field detector could be used. As best seen in FIG. 5, magnetic field detector 280 having a single magnetic field detector element 282 is positioned within magnetic sleeve 250. In this embodiment, the magnetic signature generated by the circumferentially distributed portion of array of magnets 254 may be read by rotating magnetic field detector element 282 relative to magnetic field detector 280 or by rotating magnetic field detector 280 relative to array of magnets 254.

Figure 6:
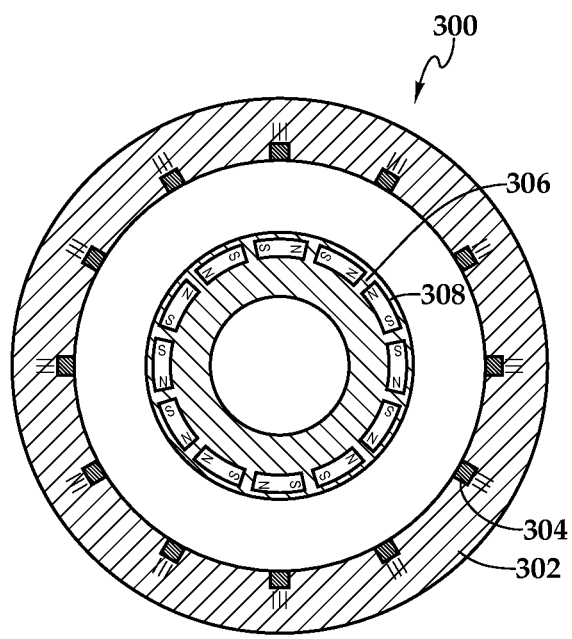
FIG. 6 is a cross sectional view of a magnetic field detector sleeve having a magnetic probe disposed therein for use in a magnetic system for location determination in a wellbore according to an embodiment of the present disclosure.

As another alternative, instead of having the array of magnets in the wellbore string that is stationary to the wellbore and having the magnetic field detector associated with the moveable string, the array of magnets could be in the moveable string and the magnetic field detector could be associated with the stationary string. For example, as best seen in FIG. 6, a detector sleeve 300 has an annular body 302 that may be disposed within a casing string in a manner similar to magnetic sleeves 100, 200 in casing string 16. An array of magnetic field detector elements 304 is positioned within annular body 302. In the illustrated embodiment, array of magnetic field detector elements 304 can be described as a circumferentially distributed array of magnetic field detector elements, in the case twelve magnetic field detector elements 304. Also seen in FIG. 6, a magnetic probe 306, which may by carried on a service string such as service string 22, preferably includes at least one circumferentially distributed array of magnetic 308 that preferably corresponds in number with the number of magnetic field detector elements 304, in this case twelve magnetic 308. In this manner, there is one-to-one correspondence between the magnetic field detector elements and the magnets, however, it should be understood by those skilled in the art that ratios other than one-to-one are possible and are considered to be within the scope of the present disclosure, for example, detector sleeve 300 could include only a single magnetic field detector element or multiple magnetic field detector elements having the same circumferential orientation. In the illustrated embodiment, when magnetic probe 306 is moved in the downhole direction through detector sleeve 300, each of the magnetic field detector elements 304 would read a magnetic field generated by at least one of the magnets 308. This magnetic signature information may be sent to the surface using a wired or wireless communication protocol. In this manner, the location of a wellbore component in a first string, in this case detector sleeve 300 in casing string 16, can be correlated to the location of a wellbore component in a second string, in this case magnetic probe 306 carried by service string 22.

Figure 7:
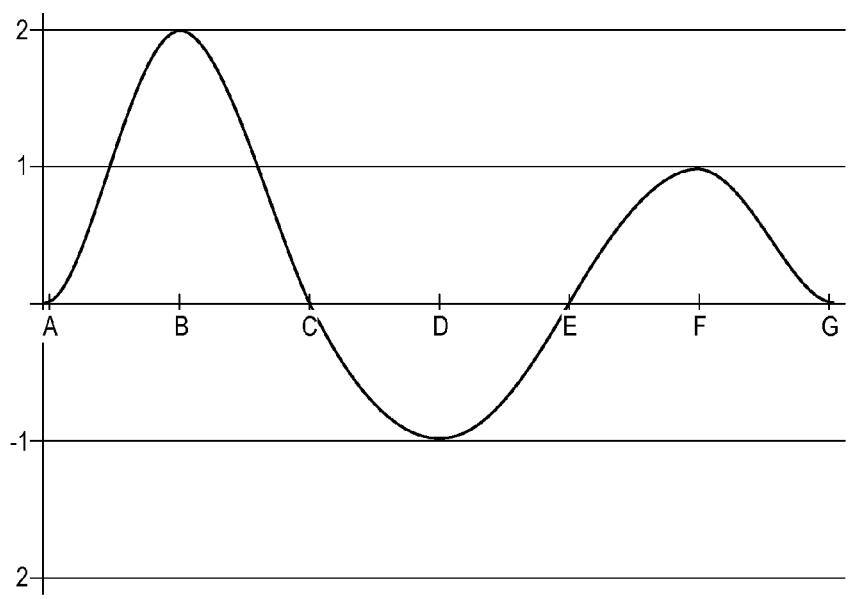
FIG. 7 is a graph of a magnetic signature obtained using a magnetic system for location determination in a wellbore according to an embodiment of the present disclosure.

In addition or as an alternative to magnetic field orientation, other factors can be used to generate unique digital addresses using magnetic signatures of the present disclosure. For example, as best seen in FIG. 7, the strength of certain magnets in the array of magnets can be used to produce a particular magnetic signature. In this case, the magnets of the axial layer to the right would be oriented as N-S polarity and have a strength that is greater than the strength of the other magnets in the array, represented by 2 in the graph. The magnets of the axial layer to the center would be oriented as S-N polarity and the magnets of the axial layer to the left would be oriented as N-S polarity. In this configuration of magnets, when magnetic field detector 24 is moved in the downhole direction through the magnetic field generated by this array of magnets, each of the magnetic field detector elements 26, 28 may detect a magnetic signature similar to that depicted in FIG. 7. In the graph, the vertical scale represents a magnetic field detector element output and the horizontal scale represents a magnetic field detector element position. In this example, the magnetic signature detected by magnetic field detector 24 when magnetic field detector 24 is moving in the downhole direction may be referred to as the digital address of (2, −1, 1). By comparing the detected magnetic signatures depicted in FIGS. 2B and 7, it can be seen that magnetic sleeves generating these signatures would have unique digital addresses; namely, (1, −1, 1) and (2, −1, 1). In this manner, the strength of certain magnets in the array of magnets can be used to produce unique digital addresses.

Figure 8:
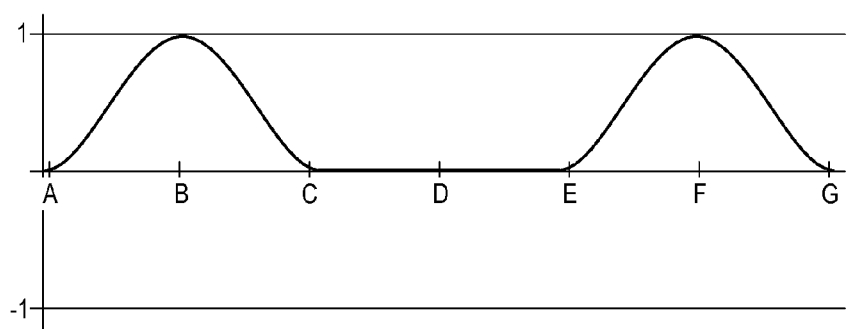
FIG. 8 is a graph of a magnetic signature obtained using a magnetic system for location determination in a wellbore according to an embodiment of the present disclosure.

In another example, as best seen in FIG. 8, the magnet spacing of certain magnets in the array of magnets can be used to produce a particular magnetic signature. In this case, the magnets of the axial layer to the right would be oriented as N-S polarity. The axial layer to the center represents a large gap or a region with no magnets and the magnets of the axial layer to the left would be oriented as N-S polarity. In this configuration of magnets, when magnetic field detector 24 is moved in the downhole direction through the magnetic field generated by this array of magnets, each of the magnetic field detector elements 26, 28 may detect a magnetic signature similar to that depicted in FIG. 8. In the graph, the vertical scale represents a magnetic field detector element output and the horizontal scale represents a magnetic field detector element position. In this example, the magnetic signature detected by magnetic field detector 24 when magnetic field detector 24 is moving in the downhole direction may be referred to as the digital address of (1, 0, 1). By comparing the detected magnetic signatures depicted in FIGS. 2B and 8, it can be seen that magnetic sleeves generating these signatures would have unique digital addresses; namely, (1, −1, 1) and (1, 0, 1). In this manner, the magnet spacing of certain magnets in the array of magnets can be used to produce unique digital addresses.

Figure 9:
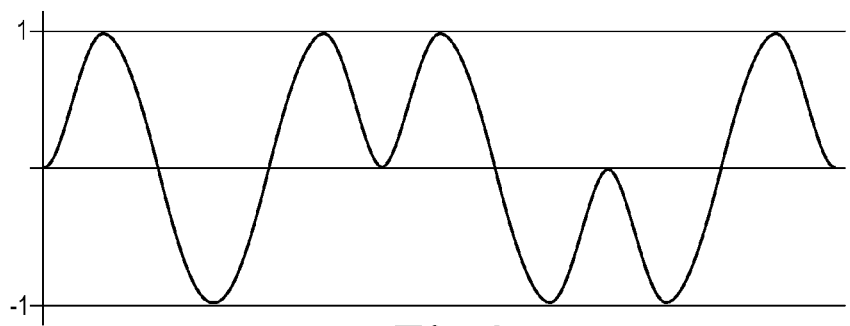
FIG. 9 is a graph of a magnetic signature obtained using a magnetic system for location determination in a wellbore according to an embodiment of the present disclosure.

In a further example, a change in magnetic field orientation, change in magnetic field strength or change in other magnetic factor can be used to generate unique digital addresses. As best seen in FIG. 9, the arrays of magnets used to generate the illustrated magnetic signature includes seven axial layers in an array of magnets similar to that shown in FIG. 2A with the following polarities: N-S, S-N, N-S, N-S, S-N, S-N and N-S. In this configuration of magnets, when magnetic field detector 24 is moved in the downhole direction through the magnetic field generated by this array of magnets, each of the magnetic field detector elements 26, 28 may detect a magnetic signature similar to that depicted in FIG. 9. In the graph, the vertical scale represents a magnetic field detector element output and the horizontal scale represents a magnetic field detector element position. In this example, the change in magnetic field orientation is used to generate the digital address of (1, 1, 0, 1, 0, 1) wherein a "1" is generated each time the polarity changes between axial layers and a "0" is generated each time the polarity stays the same between axial layers. In this method of generating digital addresses, N+1 axial layers are needed to generate an N digit digital address, in this case seven axial layers for a six digit address. Similar unique digital addresses could be generated by an array of circumferentially distributed magnets, in an array similar to that shown in FIG. 4A that is read by a magnetic field detector similar to magnetic field detector 266 described above. For example, such a digital address generated by the magnetic signature in FIG. 4D would be (0, 1, 0, 1, 1, 1, 0, 1, 1, 0, 1). In this manner, the change in magnetic field orientation, change in magnetic field strength or change in other magnetic property can be used to produce unique digital addresses.

It should be understood by those skilled in the art that the illustrative embodiments described herein are not intended to be construed in a limiting sense. Various modifications and combinations of the illustrative embodiments as well as other embodiments will be apparent to persons skilled in the art upon reference to this disclosure. It is, therefore, intended that the appended claims encompass any such modifications or embodiments.

What is claimed is:

1. A magnetic system for determining the location of a wellbore component in a first string relative to a wellbore component in a second string, the system comprising:
  a plurality of circumferentially distributed arrays of magnets positioned in the first string, the arrays of magnets each operable to produce a magnetic field in the wellbore proximate the location of the array of magnets, wherein each of the magnetic fields defines a magnetic signature, and wherein each magnetic signature comprises a unique digital address; and
  a magnetic field detector operably associated with the second string and operable to detect the magnetic signature of each of the magnetic fields, the magnetic signatures being based on the magnetic field orientation of the magnets in the respective array;

wherein, one of the first and second strings is stationary within the wellbore; and wherein, the other of the first and second strings is moveable in the wellbore such that the magnetic field detector is moveable relative to each of the magnetic fields and such that when the magnetic field detector identifies one of the magnetic signatures, the identity of the array of magnets is determined among the plurality of arrays of magnets from the unique digital address and the location of the identified array of magnets in the first string is correlated with the magnetic field detector of the second string.

2. The system as recited in claim 1 wherein the arrays of magnets are positioned in the stationary string and the magnetic field detector is operably associated with the moveable string.

3. The system as recited in claim 1 wherein the arrays of magnets are positioned in the moveable string and the magnetic field detector is operably associated with the stationary string.

4. The system as recited in claim 1 wherein the arrays of magnets further comprise an axially distributed array of magnets.

5. The system as recited in claim 1 wherein the digital addresses are generated based upon at least one of magnetic field orientation, magnetic field strength and magnet spacing of the magnets in the respective array of magnets.

6. The system as recited in claim 5 wherein the digital addresses are generated based upon changes in magnetic properties of the magnets in the respective array of magnets.

7. The system as recited in claim 1 wherein the magnetic field detector further comprises at least two magnetic field detector elements each operable to detect the magnetic signatures.

8. The system as recited in claim 1 wherein the magnetic field detector further comprises a circumferentially distributed array of magnetic field detector elements.

9. A magnetic system for determining the location of a wellbore component in a first string relative to a wellbore component in a second string, the system comprising:

a circumferentially distributed array of magnets positioned in the first string that is stationary within the wellbore, the array of magnets operable to produce a magnetic field in the wellbore proximate the location of the array of magnets; and a magnetic field detector operably associated with the second string that is moveable within the wellbore, the magnetic field detector operable to detect a magnetic signature of the magnetic field, the magnetic signature being based upon the magnetic field orientation of the magnets in the array, and the magnetic signature including a digital address that uniquely identifies the array of magnets among a plurality of arrays of magnets in the wellbore;

wherein, when the magnetic field detector is moved through the magnetic field and identifies the magnetic signature, the identity of the array of magnets is determined from the digital address and the location of the array of magnets in the first string is correlated with the magnetic field detector of the second string.

10. The system as recited in claim 9 wherein the digital address is generated based upon at least one of magnetic field strength and magnet spacing of the magnets in the array of magnets.

11. The system as recited in claim 9 wherein the digital address is generated based upon changes in magnetic properties of the magnets in the array of magnets.

12. A magnetic method for determining the location of a wellbore component in a first string relative to a wellbore component in a second string, the method comprising:

providing a circumferentially distributed array of magnets positioned in the first string and a magnetic field detector operably associated with the second string;

positioning the first and second strings in the wellbore, one of the first and second strings being stationary within the wellbore, the other of the first and second strings being moveable in the wellbore;

producing a magnetic field in the wellbore proximate the location of the array of magnets; moving the magnetic field detector relative to the magnetic field;

detecting a magnetic signature of the magnetic field, the magnetic signature being based upon the magnetic field orientation of the magnets in the array;

determining an identity of the array of magnets among a plurality of arrays of magnets in the wellbore from a unique digital address of the magnetic signature; and correlating the location of the array of magnets in the first string with the magnetic field detector of the second string.

13. The method as recited in claim 12 wherein positioning the first and second strings in the wellbore further comprising fixing the first string with the array of magnets in the wellbore and moving the second string with the magnetic field detector in the wellbore.

14. The method as recited in claim 12 wherein positioning the first and second strings in the wellbore further comprising fixing the second string with the magnetic field detector in the wellbore and moving the first string with the array of magnets in the wellbore.

15. The method as recited in claim 12 wherein producing the magnetic field in the wellbore at the location of the array of magnets further comprises producing at least a portion of the magnetic field with an axially distributed array of magnets.

16. The method as recited in claim 12 wherein producing the magnetic field in the wellbore at the location of the array of magnets further comprises generating the digital address based upon at least one of magnetic field orientation, magnetic field strength and magnet spacing of the magnets in the array of magnets.

17. The method as recited in claim 12 wherein producing the magnetic field in the wellbore at the location of the array of magnets further comprises generating the digital address based upon changes in magnetic properties of the magnets in the array of magnets.

18. The method as recited in claim 12 wherein detecting the magnetic signature further comprises detecting the magnetic signature with at least two magnetic field detector elements.

19. The method as recited in claim 12 wherein detecting the magnetic signature further comprises detecting the magnetic signature with an array of circumferentially distributed magnetic field detector elements.

* * * * *